(12) United States Patent
Jonas et al.

(10) Patent No.: US 11,693,384 B2
(45) Date of Patent: Jul. 4, 2023

(54) PRODUCTION AND MEASUREMENT OF WORKPIECES

(71) Applicant: RENISHAW PLC, Wotton-under-Edge (GB)

(72) Inventors: Kevyn Barry Jonas, Clevedon (GB); Stephen Wisher-Davies, Trowbridge (GB)

(73) Assignee: RENISHAW PLC, Wotton-under-Edge (GB)

( * ) Notice: Subject to any disclaimer, the term of this patent is extended or adjusted under 35 U.S.C. 154(b) by 75 days.

(21) Appl. No.: 16/611,988

(22) PCT Filed: May 31, 2018

(86) PCT No.: PCT/GB2018/051478
§ 371 (c)(1),
(2) Date: Nov. 8, 2019

(87) PCT Pub. No.: WO2018/220373
PCT Pub. Date: Dec. 6, 2018

(65) Prior Publication Data
US 2020/0233392 A1    Jul. 23, 2020

(30) Foreign Application Priority Data
Jun. 1, 2017 (GB) ...................................... 1708730

(51) Int. Cl.
*G05B 19/048*    (2006.01)
*G01B 21/04*    (2006.01)

(52) U.S. Cl.
CPC ........... *G05B 19/048* (2013.01); *G01B 21/04* (2013.01); *G05B 2219/32368* (2013.01)

(58) Field of Classification Search
CPC ........ G05B 19/048; G05B 2219/32368; G05B 2219/32018; G05B 19/41875; G01B 21/04; Y02P 90/02
See application file for complete search history.

(56) References Cited

U.S. PATENT DOCUMENTS 4,848,137 A    7/1989    Turner et al.
4,918,627 A    4/1990    Garcia et al.
(Continued)

FOREIGN PATENT DOCUMENTS

CN    106031328 A    10/2016
CN    103827623 B    12/2016
(Continued)

OTHER PUBLICATIONS

Sommer, Stephen, "Diagnostic concepts for Automated Assembly and Workpiece Inspection Systems (AAWIS)", Dec. 2, 2011, University of Applied Science (UAS) Wurzburg-Schweinfurt, https://www.db-thueringen.de/servlets/MCRFileNodeServlet/dbt_derivate_00024436/ilm1-2011imeko-012.pdf (Year: 2011).*
(Continued)

*Primary Examiner* — Charles R Kasenge
(74) *Attorney, Agent, or Firm* — Oliff PLC (57) ABSTRACT

In a workpiece production method a plurality of nominally similar workpieces are produced in a production process on one production machine. The order or time of production of some of the workpieces on the production machine is recorded. Some of the workpieces recorded are measured at two or more inspection stations. Dimensions or points of one workpiece are measured at one of the inspection stations, and corresponding dimensions or points of another of the workpieces are measured at another of the inspection stations. The results of the measurements of corresponding dimensions or points made at the two or more inspection stations are analysed together, taking account of the order or (Continued)

time of production of the workpieces. An output signal is produced based on the analysing of the results together. The output signal indicates performance of the production machine or of one or more of the inspection stations.

26 Claims, 6 Drawing Sheets (56) References Cited

U.S. PATENT DOCUMENTS

| | | | |
|---|---|---|---|
| 5,189,624 A | | 2/1993 | Barlow et al. |
| 5,440,478 A | | 8/1995 | Fisher et al. |
| 6,400,998 B1 | | 6/2002 | Yamazaki et al. |
| 6,571,145 B1 | | 5/2003 | Matsumiya et al. |
| 6,797,526 B2 | * | 9/2004 | Tanaka .............. H01L 21/67276 |
| | | | 257/E21.525 |
| 7,809,458 B2 | * | 10/2010 | Sasko .............. G05B 19/41875 |
| | | | 700/101 |
| 9,739,606 B2 | | 8/2017 | Jonas et al. |
| 2001/0048761 A1 | * | 12/2001 | Hamamatsu ....... G01N 21/9501 |
| | | | 382/149 |
| 2003/0040830 A1 | | 2/2003 | Parikh et al. |
| 2003/0040948 A1 | | 2/2003 | Sakaguchi |
| 2003/0054573 A1 | * | 3/2003 | Tanaka ................... H01L 22/20 |
| | | | 438/4 |
| 2003/0138978 A1 | * | 7/2003 | Tanaka .............. H01L 21/67276 |
| | | | 438/5 |
| 2005/0033464 A1 | | 2/2005 | Nguyen |
| 2009/0248173 A1 | * | 10/2009 | Sasko .............. G05B 19/41875 |
| | | | 700/9 |
| 2009/0319077 A1 | | 12/2009 | Cameron |
| 2010/0228510 A1 | | 9/2010 | Okubo |
| 2014/0277662 A1 | | 9/2014 | Kesler et al. |
| 2015/0243108 A1 | | 8/2015 | Nakayama |

FOREIGN PATENT DOCUMENTS

| | | |
|---|---|---|
| EP | 2 913 148 A1 | 9/2015 |
| EP | 3 102 018 B1 | 9/2019 |
| JP | H11-251390 A | 9/1999 |
| JP | 2006-318316 A | 11/2006 |
| JP | 2007-115945 A | 5/2007 |
| WO | 02/29733 A1 | 4/2002 |
| WO | 2013/021157 A1 | 2/2013 |

OTHER PUBLICATIONS

Sep. 29, 2017 Search Report issued in Great Britain Patent Application No. GB1708730.5.

Aug. 23, 2018 Search Report issued in International Patent Application No. PCT/GB2018/051478.

Aug. 23, 2018 Written Opinion issued in International Patent Application No. PCT/GB2018/051478.

* cited by examiner

FIG. 1

| PART RECORD |
|---|
| Part ID |
| Timestamp |
| Part number |
| Machine tool ID (MT-ID) |

PRODUCTION AND MEASUREMENT OF WORKPIECES

FIELD OF THE INVENTION

This invention relates to the production and measurement of workpieces or parts, and also to methods and manufacturing systems for such production and measurement. The terms "workpiece" and "part" are used interchangeably in this specification.

DESCRIPTION OF PRIOR ART

An automated factory manufacturing system may comprise one or more production machines (such as machine tools) for producing workpieces. Typically these may be produced as a series of nominally identical workpieces. The manufacturing system may also comprise one or more inspection stations for inspecting the workpieces produced. An inspection station may comprise conventional gauging such as fixture gauges, or even manual gauges such as height gauges or calipers. Or it may comprise a coordinate measuring machine (CMM) for measuring the workpieces, or a comparative gauging machine for comparing them with a master reference. These production and inspection machines may each have a numerical control or computer control, linked by a network to one or more server computers. An example is seen in U.S. Pat. No. 5,189,624 (Barlow et al).

A proportion of workpieces produced on a production machine (or even all workpieces produced) may be inspected at an inspection station. A server may schedule workpieces which are to be transferred to an inspection station, and may control transfer robots or conveyors for this purpose.

In some prior art examples, the inspection results may simply be a pass or fail decision. In the case of fail decision (a rejection), this can be fed back to allow adjustment of the production machine, so as to control and improve the subsequent production process. Such control of the production process is performed manually in the example of U.S. Pat. No. 5,189,624. Alternatively, even in the case of a pass decision, if a dimension of a single workpiece has exceeded a control limit, an automatic feedback may be provided to adjust the production machine, e.g. to update a cutting tool offset by an appropriate percentage of the error in the dimension. In this case the control limit may be set at a lower level than the tolerance limit at which workpieces would be rejected. Alternatively, the control limit could be set at the level at which workpieces are rejected.

It is known to perform more sophisticated analysis of the inspection results of multiple workpieces in the series of nominally identical workpieces. For example, a series of measurements of a particular dimension on successive workpieces may be filtered to remove outliers. Alternatively, the series of measurements may be analysed to detect a trend. For example, if the production machine is a machine tool with a cutting tool which wears in use, or which is subject to thermal drift, there may be a gradual trend in which the dimension of a feature of the produced workpieces increases or decreases over time. Such analyses may be performed after inspecting workpieces in a quality control room or laboratory, separate from the production machines. Manual correction of the production process may subsequently be applied by a skilled machine operator, but will not have a beneficial effect on workpieces which have been produced in the meantime.

U.S. Pat. No. 6,400,998 shows a system in which workpieces produced on a machine tool are inspected on a measuring machine. The measurement results may be analysed in various ways and fed back to the machine tool.

Analysing trends requires that the workpieces should be inspected at the inspection station in the same order as they are produced by the production machine. Otherwise the trend would not easily be observed. Conventionally, this is achieved by sending all the workpieces which are to be inspected from a given production machine to the same inspection station, as they are produced.

However, that is a constraint on the production scheduling performed by the server, which may result in inefficient usage of the production machines and inspection stations in the factory. It also requires that the speed of the inspection should be sufficiently fast, so that the production is not slowed down by the inspection.

US 2010/0228510 discloses a quality information control analysis system for analysing defects in products being assembled by a plurality of assembly machines or installations. When a product is inspected by an inspection machine after assembly, the inspection results may specify the existence of a defective component and the type of defect that has been detected. The products are not inspected on a measuring machine and accordingly the inspection results do not include measurement results, so that for example it is not possible to determine a gradual trend in which the dimension of a feature of the product increases or decreases over time. Furthermore, US 2010/0228510 relates to assembly of already-manufactured components rather than to a manufacturing system which comprises one or more production machines (such as machine tools) for producing a series of nominally identical workpieces. It is also not taught that the output from a particular assembly machine can be sent to any available inspection machine.

SUMMARY OF THE INVENTION

The present invention provides a workpiece production method comprising:
producing a plurality of nominally similar workpieces in a production process on at least one production machine;
recording the order or time of production of at least some of the workpieces on the production machine;
measuring at least some of the workpieces so recorded at two or more inspection stations; wherein dimensions or points of one workpiece are measured at one of the inspection stations, and corresponding dimensions or points of another of the workpieces are measured at another of the inspection stations; and
analysing together the results of the measurements of corresponding dimensions or points made at the two or more inspection stations, taking account of the order or time of production of the workpieces.

In the preferred embodiments of the invention, recording the order of production of the workpieces and taking it into account while analysing the results enables the use of more than one inspection station for workpieces produced by a given production machine, and reduces the constraints noted above on production scheduling. This may enable the production scheduling to make more efficient use of the production machines and inspection stations in the manufacturing system or factory.

An output signal may then be produced, based on analysing the results together, the output signal indicating performance of the production machine or of one or more of the inspection stations. It is possible to assess the production process, or to determine the process capability of the production machine or the capability of an inspection machine at an inspection station. For example, the analysis may quantify the capability of the production machine to manufacture workpieces to a predetermined tolerance.

The output signal may be an alarm signal or a message to a human operator if the results are approaching or exceed a predetermined limit value or tolerance value. In some preferred embodiments, however, the output signal is fed back to the production machine to adjust the production process of the production machine. For example, it may be a tool offset value to correct production of future workpieces.

The order of production of the workpieces may be derived from the times of their production. When analysing the results of the measurements, account may be taken of time intervals between the times of production of the workpieces.

Analysing the results of the measurements may produce an ordered history of the performance of the production machine over time. The method may include detecting whether there is a trend in the results of the measurements over time. For example, it may be detected that a particular dimension is gradually increasing (or decreasing) in size and/or detected that the coordinates of a particular point are changing as successive workpieces are produced; this may be an indication that a tool is wearing or that the setup of the machine is drifting in some other way. The method may include detecting whether there is a trend in the performance of the production machine over time. It may detect when a particular dimension of a workpiece or the coordinates of a particular point has exceeded a control limit. Or it may filter a series of measurements of a particular dimension or point on successive workpieces to smooth the results or to remove outliers, and optionally detect when the filtered series of measurements has exceeded a control limit. The results of the measurements may be analysed statistically to determine the process capability of the production machine which produced the workpieces. Any of the above assessments of the production machine may be directed to individual tools or tool turrets of the machine, or to the machine as a whole.

There may be a plurality of production machines, and each production machine may be associated with two or more inspection stations. Each inspection station may measure dimensions or points on workpieces produced only by one particular production machine, for example in a production cell where the two or more inspection machines are arranged with that production machine. Or one or more of the inspection stations may measure dimensions or points on workpieces produced by more than one of the production machines, to form a more flexible manufacturing system.

In another embodiment of the invention, the analysis of the results comprises comparing the results of the measurements of corresponding dimensions or points made at the two or more inspection stations, and the output signal is provided if the results from one of the inspection stations differ by more than a predetermined amount from the results of one or more of the other inspection stations. This may allow an assessment of the capability of an inspection machine at the inspection station.

The invention also includes manufacturing systems arranged to operate any of the above methods. Such a manufacturing system may comprise: one or more production machines; two or more inspection stations; and a control system for scheduling the production of workpieces on the one or more production machines and the inspection of workpieces so produced at the inspection stations; wherein the control system is configured to operate a method as described above.

The or each production machine may be a machine tool. The or each machine tool may perform a machining operation in order to produce a workpiece.

BRIEF DESCRIPTION OF THE DRAWINGS

Preferred embodiments of the invention will now be described by way of example, with reference to the accompanying drawings, wherein.

DESCRIPTION OF PREFERRED EMBODIMENTS

Figure 1:
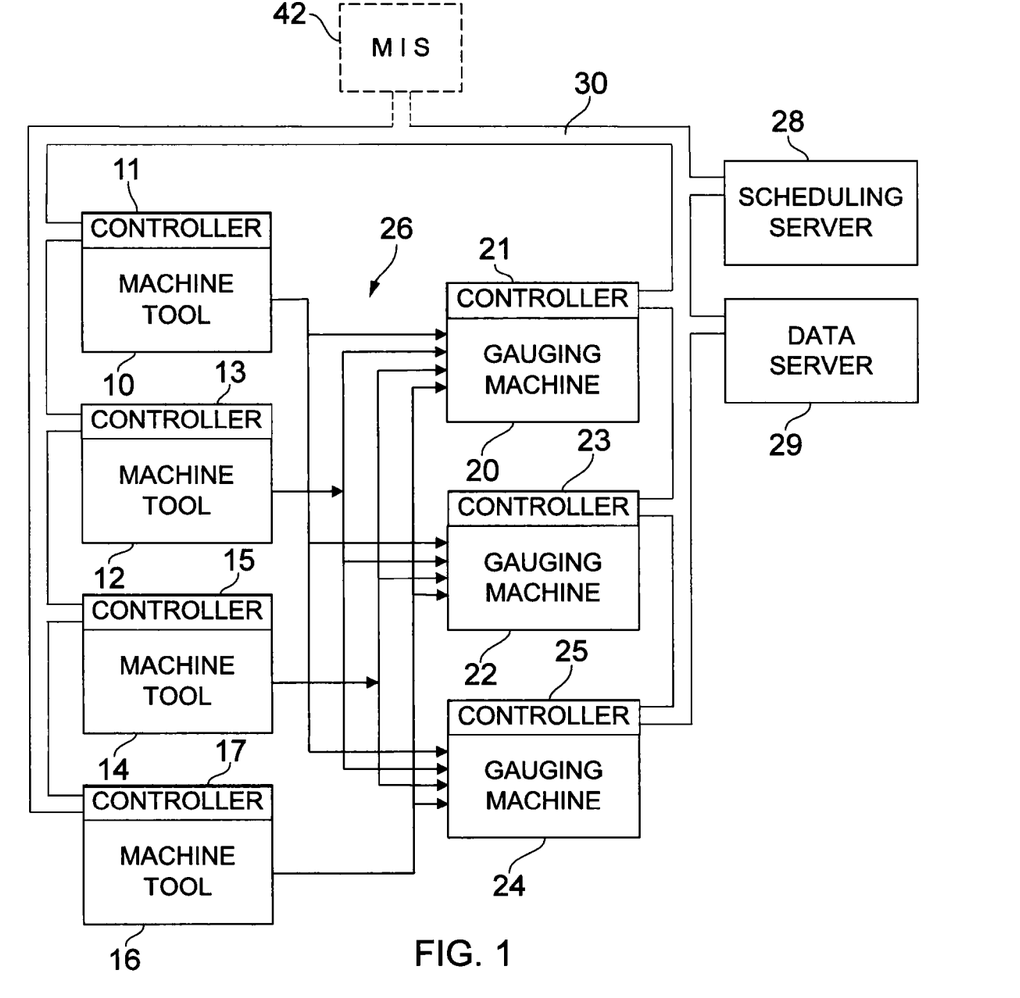
FIG. 1 is a schematic diagram of a manufacturing system arrangement in a factory, including production machines and inspection machines.

The manufacturing arrangement of FIG. 1 includes a number of production stations, each comprising a computer numerically controlled (CNC) production machine 10, 12, 14, 16 for producing parts (workpieces). The production machines may use any manufacturing technology. They may be machine tools such as milling machines, lathes, mill-turning centres, machines for grinding, drilling, laser cutting, lapping, honing, polishing, etc. Or they may be coating machines, forges, presses, or additive manufacturing machines (3D printing). The exact number of these machines is unimportant; there may be one or more. Any combination of different types of production machine may be present, or they may all be identical.

Each production machine is controlled by a respective controller 11, 13, 15, 17 which may comprise a conventional CNC control. Optionally, any or all of the controllers may include a separate computer in communication with the CNC control.

The manufacturing arrangement also includes two or more inspection stations, each comprising an inspection machine, preferably a CNC gauging machine 20, 22, 24 for inspecting parts (workpieces) produced by the production machines. A suitable flexible comparative gauging machine is sold by the present applicants Renishaw plc under the trade mark EQUATOR. As described in our earlier international patent application no. WO 2013/021157, which is incorporated herein by reference, this gauging machine has a motorised structure with a non-Cartesian geometry. This moves a probe in three dimensions relative to a production workpiece, in order to compare the production workpiece to a master reference workpiece. Each gauging machine is controlled by a respective computer controller 21, 23, 25.

Instead of these gauging machines, the inspection stations could comprise other dimensional measuring equipment, such as computer-controlled coordinate measuring machines (CMMs) or inspection robots. Alternatively, they may comprise gauging fixtures or jigs, in which gauges with LVDT or other transducers are custom-designed to measure specific dimensions of the workpieces. The measurement results of these gauges may be fed automatically or manually into the respective controller 21, 23, 25. It is also possible to have inspection stations in which workpieces are measured manually using conventional hand-held gauges such as height gauges or calipers, the results being fed into the controller 21, 23, 25 or into a terminal of a common server computer.

The manufacturing arrangement further includes a transport system (indicated schematically by an arrow 26), for transferring parts (workpieces) from any of the machine tools 10, 12, 14, 16 to any of the gauging machines 20, 22, 24. Here they can be inspected for conformance to specified dimensional tolerances. The transport system could comprise computer-controlled robots, vehicles or conveyors, or could simply involve the manual transfer of workpieces or pallets of workpieces. It may be part of a larger transport system which also supplies raw billets or castings for machining to the machine tools, and/or removes workpieces after manufacture or after inspection. If necessary, it may return a workpiece to a machine tool for re-work after inspection.

A job scheduling server 28 is also provided. A program or software module in this server 28 is responsible for scheduling the production of workpieces, and is connected to the CNC controllers of the machine tools and gauging machines by one or more data buses 30. The scheduling server 28 also controls the transport system 26, e.g. for transferring workpieces between the machine tools and the gauging machines when required. For example, the scheduling server 28 may take the form of a programmable logic controller, as used conventionally to control a production cell with multiple machine tools, but with different programming as described below.

The scheduling server 28 may provide the machine tools and gauging machines with the necessary CNC part programs for machining and inspecting each particular design of part (workpiece) to be produced, as they are required.

Alternatively, these part programs may be stored in the controllers of the machine tools and gauging machines, and selected for use on the basis of instructions received from the scheduling server 28.

Typically, the scheduling server 28 may schedule that a series of nominally identical parts (workpieces) of a particular design are to be produced on (say) the machine tool 10. Conventionally, it could then instruct that each of these workpieces is to be transferred to the gauging machine 20 and schedule its inspection on that machine. Or it could schedule that a regular sample of the workpieces is inspected (e.g. that every 10th workpiece is inspected; or that a workpiece is inspected after a given time period has elapsed, such as one workpiece per hour).

Inspection of each workpiece on the gauging machine 20 produces multiple dimensional measurements which are passed back to a data server 29 on the bus 30 and stored. If a workpiece is determined to be out of tolerance, either by the data server 29 or by the controller 21, 23, 25 of the gauging machine, then a message may be passed to the scheduling server 28. This message may specify that the out-of-tolerance workpiece should be rejected or scheduled for re-work.

In addition to rejection or re-work, the data server 29 also has a software module programmed to perform process control. It examines trends in the inspection measurement results from successive workpieces as they are inspected. It may for example determine a trend that a particular dimension is gradually increasing in size as successive workpieces are produced. That may be caused by wear of an associated cutting tool in the machine tool 10, or by gradual thermal growth of the machine tool or of the raw material stock or billets or castings from which the workpieces are machined. The data server 29 can then feed back an updated offset value for the corresponding cutting tool over the bus 30 to the CNC control of the machine tool 20. This corrects the machining process to ensure that future workpieces in the series remain in tolerance.

Of course, the scheduling and the storage and processing of inspection results may all be performed on a single server running corresponding software modules, rather than on separate scheduling and data servers 28, 29 as described.

Alternatively, in a large factory, there may be multiple production cells, each with its own scheduling server 28 controlling a plurality of machine tools and gauging machines. The measurement results from the gauging machines in multiple production cells may be sent for processing to a common data server 29 serving all the production cells.

As another alternative, in a large factory there may be two or more data servers 29, with one or more scheduling servers 28. These should preferably have appropriate network links and software to exchange data. The data may be stored in a shared database (or in an underlying data layer in the software architecture) so that measurements of workpieces may be processed by any of the data servers. Alternatively all measurements of workpieces from a given production machine may be received and processed by a particular one of the data servers, whichever inspection machine they were measured on.

If desired, the scheduling server 28 and/or data server 29 may be located remotely from the factory, scheduling production and/or receiving the measurement results over a wide area data network or the internet. Such remote servers may even schedule production and/or receive and process measurement results from production cells in two or more factories in different locations. If the data server 29 is located in the factory, it is possible for the data which it stores to be mirrored on a remote server, to aid and assess quality control of the production process.

A server 28 which schedules the production and controls the production machines and gauging machines is not essential. The production scheduling, the usage of the various machines and the transfer of workpieces between machines may be all be decided and performed by human operators instead.

In order to determine trends in the measurements, the workpieces from a given machine tool 10 could all be presented to the same gauging machine 20, in the same order that they are produced by the machine tool 10. However, that would be a limitation on the flexibility of the overall production in the factory. It may occur that the gauging machine 20 is busy when a workpiece produced by the machine tool 10 is required to be inspected. For example, the time required to inspect a workpiece typically differs from the time required for its production. Furthermore, the gauging machine 20 might be required for inspection of other workpieces produced on one of the other machine tools 12, 14, 16. These other workpieces may be of the same or a different design to the series being produced by the machine tool 10.

In the present embodiments of the invention, therefore, when a workpiece from the machine tool 10 is to be inspected, the scheduling program in the server 28 is configured to send it to whichever gauging machine 20, 22, 24 is least busy or most appropriate, and to supply or instruct the use of the appropriate inspection program by that machine. Or if there is a manual transport system, a human operator may be sent an instruction to transfer the workpiece manually to an appropriate gauging machine. In a less sophisticated system, the human operator may decide which gauging machine to use.

As workpieces are sent to different gauging machines, a record is kept of the order of their production. For example, this may be a timestamp of the time of production of each workpiece on the machine tool 10. Examples of this are discussed below in relation to FIGS. 2-4.

Figure 2:
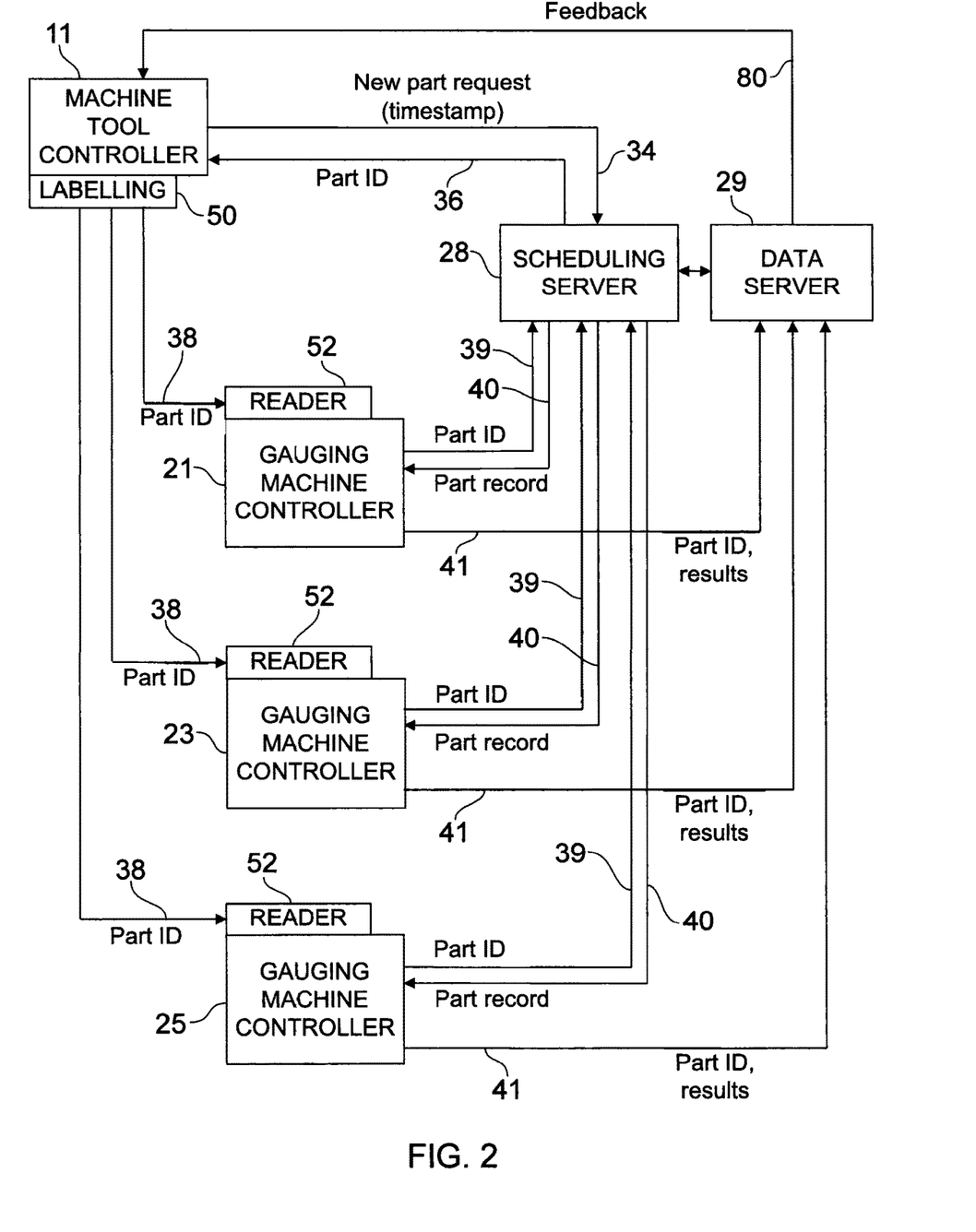
FIG. 2 is a schematic diagram showing a first embodiment of a scheme for information flow in the manufacturing arrangement of FIG. 1.

FIG. 2 is a schematic diagram showing a first embodiment of a scheme for the information flow between the scheduling and data servers 28, 29, the controller 11 of one of the machine tools 10, and the controllers 21, 23, 25 of several gauging machines 20, 22, 24.

The scheduling program or module in the server 28 instructs the controller 11 of the machine tool 10 to produce parts (workpieces) by sending an instruction (including a part number) to the machine tool controller 11, over the bus 30 (FIG. 1). The part number specifies the design of the part which is to be produced, for example corresponding to the number of a design drawing or computer-aided design (CAD) file of the part. The controller 11 of the machine tool 10 then loads and runs a corresponding CNC part program for producing parts to the specified design. It may load the part program from its own internal storage, or it may receive it with other data over the bus 30.

When the machine tool 10 is about to produce a new part (workpiece), its controller 11 sends a new part request 34 over the bus 30 to the scheduling server 28. This request includes a timestamp for the part, generated by the controller 11 of the machine tool 10.

Figure 5:
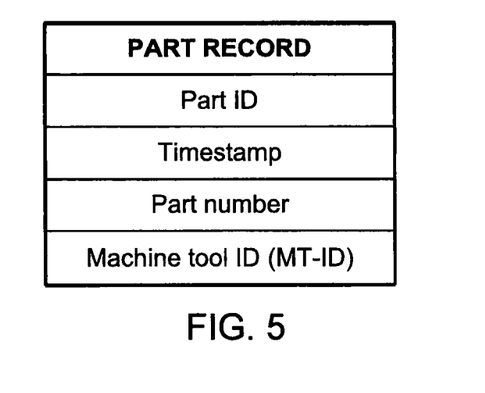
FIG. 5 shows a part record used in these embodiments.

When it receives the request 34, the scheduling server 28 sets up a new central record for the part, with fields for various items of information, as shown in FIG. 5. These fields include:

A new, unique workpiece/part identity number (part ID) generated by the scheduling server 28. This identifies the individual part (workpiece) which is about to be produced.

The timestamp contained in the request 34.

The part number which refers to the design of the part. This may for example have been confirmed by the controller 11 in the request 34.

An identity number MT-ID for the machine tool 10. Again, this may for example have been confirmed by the controller 11 in the request 34.

The scheduling server 28 then transmits a response 36 over the bus 30 back to the controller 11 of the machine tool 10. This response 36 includes the part ID which has been generated.

The machine tool then machines the part (workpiece) under CNC control, in the conventional manner. When it has finished, the scheduling program may instruct the transport system 26 to transfer the part to one of the gauging machines 20, 22 or 24 for inspection. Or if there is a manual transport system, it may send an instruction to a human operator. As mentioned above, the schedule may require all parts to be inspected, or a regular sample of them, and suitably the scheduling server is programmed with the flexibility to choose whichever of the gauging machines is least busy or most appropriate.

As indicated at 38, the part ID of the part is transferred with the part from the machine tool 10 to the gauging machine. This may be done by labelling the part (or a pallet or fixture on which it is transferred) at a labelling station 50 connected to the machine tool controller 11. For example, the labelling station may produce a machine-readable barcode label including the part ID. This label may be attached to the part or to its pallet or fixture either automatically by a robot, or manually by a human operator.

When the machined part reaches the gauging machine 20, 22 or 24, a barcode reader 52 connected to the gauging machine controller 21, 23 or 25 reads its part ID from its label. As indicated at 39, the gauging machine controller then sends the part ID over the bus 30 (FIG. 1) to the scheduling server 28. The server 28 looks up the corresponding part record (FIG. 5) and as indicated at 40 it returns the part number which specifies the design of the part (and optionally it may return the whole part record).

The gauging machine controller then loads a corresponding part program for inspecting parts of the specified design. It may load the part program from its own internal storage, or it may receive it from the server 28 over the bus 30. It runs the program to inspect the part, measuring specified dimensions or the coordinates of specified points and producing a set of inspection results. It transmits these over the bus 30 to the process control module in the data server 29. This is indicated at 41 in FIG. 2. The part ID and optionally the part number are also transmitted over the bus 30 together with those results.

Figure 6:
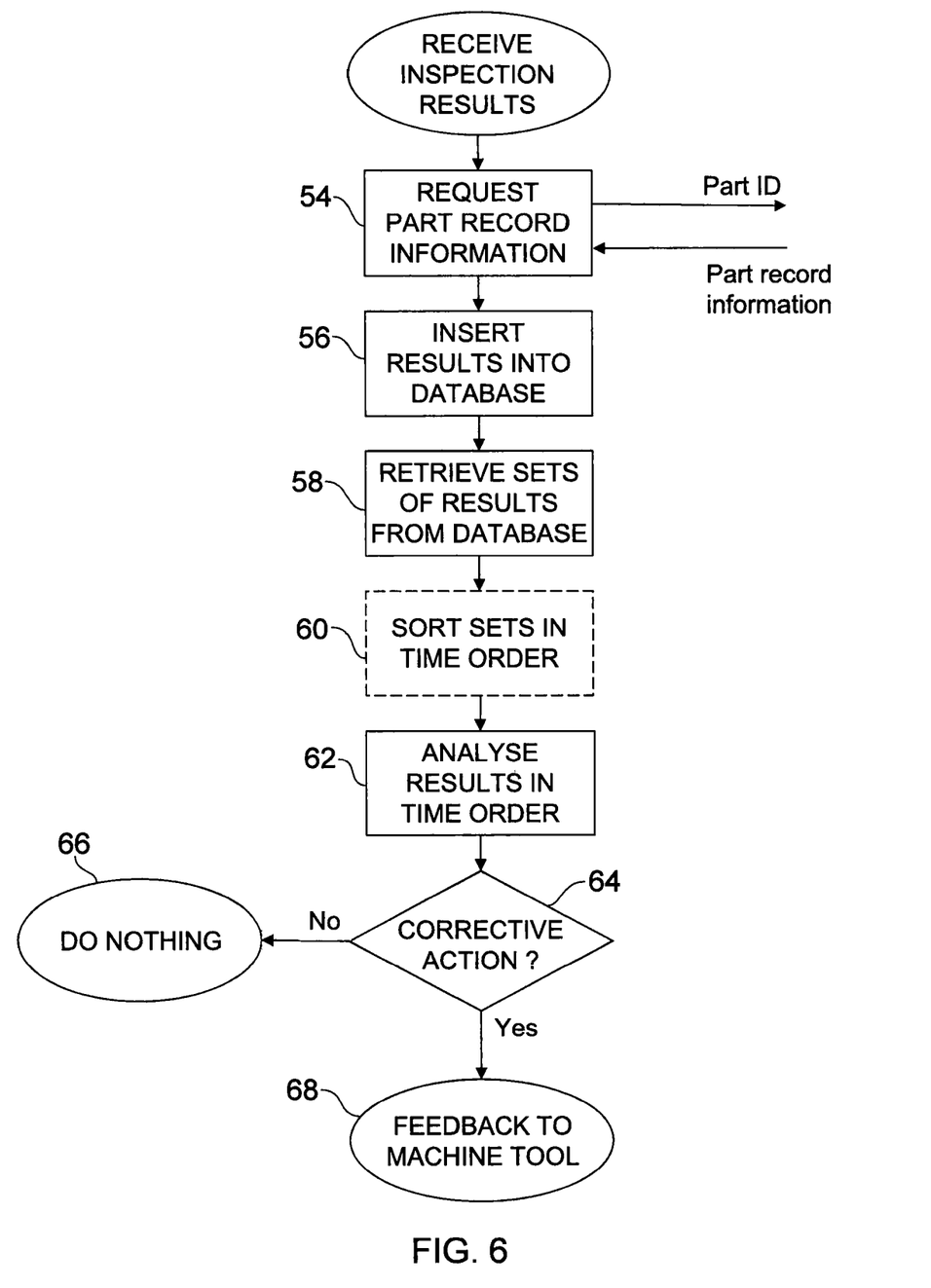
FIG. 6 is a flowchart showing the operation of a process control module which runs in a data server in FIGS. 1-4.

FIG. 6 is a flowchart showing an example of the process control module which runs in the data server 29. In step 54, when it receives a set of inspection results, it requests the scheduling server 28 to send the record information for the part, as identified by the accompanying part ID. As shown in FIG. 5, this part record information includes the identity number MT-ID of the machine tool which produced the part, and the timestamp generated at the time of production. It may also include the part number, as an alternative to transmitting it with the inspection results from the gauging machine. It will be recalled that the part number specifies the design of the part and the CNC part program used to machine it.

Alternatively, instead of the step 54, the scheduling server 28 may previously have returned the whole part record to the gauging machine controller. In this case, the gauging machine controller transmits the whole part record on to the data server 29 with the inspection results (at 41 in FIG. 2). There is then no need to request the part record information in step 54.

In step 56, the set of inspection results is inserted into a database kept in the data server 29, together with the corresponding part record information. This database comprises a historical record of the inspection results and part record information for all parts made by all the machine tools 10, 12, 14, 16 over a required period of time. These results may have been produced by any of the gauging machines 20, 22, 24, and an identity number of the relevant gauging machine may also be included in the record.

Figure 7:
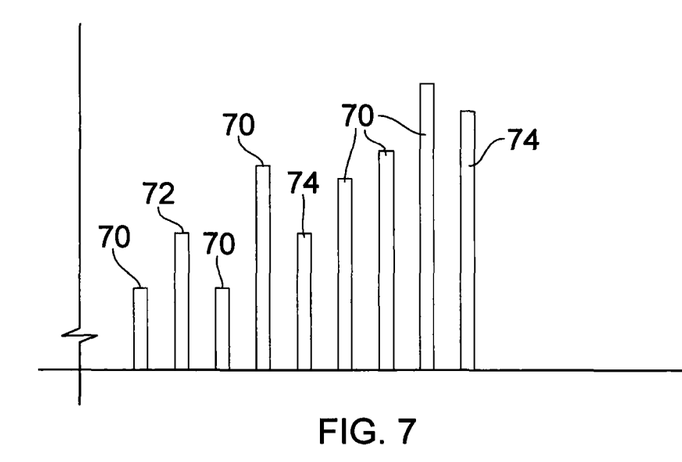
FIG. 7 is a graph illustrating measurement results received by the process control module.

FIG. 7 shows the measurement results of a particular dimension or coordinate point of a particular feature of the nominally identical parts produced by one of the machine tools (e.g. the machine tool 10). They are shown in the order they are received by the process control module in FIG. 6. Bars 70, 72, 74 represent the measurements of the particular dimension or point from successive nominally identical parts, which have been respectively taken on different gauging machines 20, 22, 24.

In step 58, the process control module then uses the part number and MT-ID of the results set just received to interrogate its database. It retrieves a predetermined number of the most recent sets of inspection results for parts having that part number and MT-ID. These represent the most recent nominally identical parts of that design produced by the machine tool concerned, e.g. by the machine tool 10 in the present example. The number of sets of results thus retrieved for processing is predetermined by the user according to the manufacturing process and the tolerance requirements of the parts concerned. For example, the most recent 10 or 20 sets of results may be selected. Of course, near the start of a production run fewer sets of results will be available.

Figure 8:
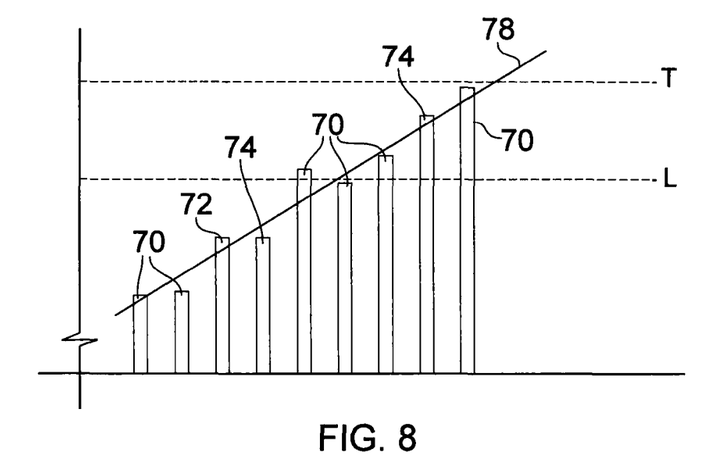
FIGS. 8 and 9 are graphs illustrating possible analyses performed by the process control module.

Preferably the sets of results in the database are indexed on the timestamp, so that in step 58 they are retrieved in the order in which the machine tool produced the parts. Otherwise, they are sorted on the timestamp in a sorting step 60, if necessary. FIG. 8 shows the same measurements as FIG. 7, arranged in the order of their production on the machine tool 10. Since the order of production is taken from the stored timestamps generated by the particular machine tool 10, it does not matter if the parts were not measured in the order of production, perhaps because they were measured on different gauging machines 20, 22, 24 at different times. This may occur, for example, if there is a queue of inspection jobs at one of the gauging machines, so the scheduling server 28 has rescheduled subsequent inspection jobs to a different machine.

Having got the sets of results in the order of production of the parts, the process control now proceeds in step 62. Here the sets of results are analysed in that order, to produce an ordered history of the performance of the production machine or of the relevant tool or tool turret of the production machine which machined the feature concerned. This is done according to pre-set rules which again depend on the manufacturing process and the tolerance requirements of the parts concerned. Suitable rules are known to those skilled in this field. Some possible rules are illustrated graphically in FIG. 8.

In FIG. 8, the broken line T denotes a maximum tolerance limit for the dimension or coordinate point concerned. The successive measurements exhibit a trend increasing towards the tolerance limit T. This may be a trend in the overall performance of the machine tool 10 or other production machine, or in the performance of a tool-holding turret of the machine tool, e.g. caused by thermal drift. Or there may be a trend caused by gradual wear affecting the performance of an individual cutting tool used to machine the parts. The broken line L denotes a predetermined lower control limit, chosen to enable correction of the production process before the tolerance limit is exceeded, so that production of in-tolerance parts can continue uninterrupted.

One possible pre-set rule may simply assess whether the measured dimension or point coordinates have exceeded the control limit L. In FIG. 8 this is true of the fifth measurement bar. A more sophisticated rule analyses the successive measurement results statistically, e.g. using a least squares analysis. This may examine the results for a trend as indicated by the line 78. The rule may be triggered when such a trend is detected, according to suitably chosen criteria such as detecting when the slope of the line 78 exceeds a predetermined value. Or another possibility is that the rule may assess whether and when the trend will exceed the control limit L. In FIG. 8 this is true of the sixth measurement bar, but may be predicted from earlier measurements. Other possible rules may detect a decreasing trend in the measurements, or whether and when a decreasing trend (or an individual measurement) exceeds a predetermined control limit in a negative direction, before a minimum tolerance level is reached. Other possible rules filter the series of measurements to smooth the results or to remove outliers in the results which do not contribute to a general trend. This may be done before determining whether the filtered series of measurements exceeds the control limit or exhibits a trend.

Step 64 in FIG. 6 makes a decision, depending on the outcome of the analysis in step 62. If the rule has not been triggered, the program does nothing (step 66) and just loops back to the beginning to await further inspection results.

If the rule has been triggered, then corrective action is required. For example, the step 64 may generate a control signal or value, such as a new tool offset. The new tool offset could for example be a percentage of the error in the measured dimension, arranged in a sense to counter the detected trend. This is fed back to the machine tool 10 in step 68, as shown at 80 in FIG. 2, and the program again loops back to the beginning to await further inspection results. In this case, the new tool offset adjusts the cutting tool of the machine tool 10 which is responsible for cutting the part feature of which the dimension has been analysed. In this way, the data server 29 produces a control signal or value which is used to adjust the production process of the machine tool, to ensure that it continues to produce good parts within the tolerance limit T.

Other feedback actions are possible. For example, if the analysis shows that the tolerance limit T has been exceeded suddenly and unexpectedly, indicating that the cutting tool has broken, the machine tool 10 may be instructed to substitute a replacement cutting tool for future production. The data server 29 then also instructs the scheduling server 28 that the out-of-tolerance workpiece is to be rejected or re-worked. It is also possible that the step 64 could just produce an alarm or send a message to request action by a human operator to investigate the problem with the machine tool.

It is also possible to perform a statistical analysis in the analysis step 62, giving statistical process control automatically in real time on the factory floor, rather than as a result of a subsequent analysis in a quality control room or laboratory. Such statistical process control may determine the process capability of the production machine or of a tool or tool turret of the machine, that is its capability to produce parts to a predetermined desired tolerance e.g. in terms of a known process capability index such as $C_{pk}$, $C_p$ or $P_{pk}$. This may simply be output as a management report, or it may be used to feed back to adjust the production process as described above. Or it is possible that the production machine may be fully capable of producing parts to the required tolerance, but offset from the nominal required dimensional values. In this case a correction is fed back to adjust the production machine to remove the offset.

FIG. 8 shows the measurement bars 70, 72, 74 placed simply in the order of production on the machine tool 10, so they are spaced equally. This may be appropriate, for example, if tool wear is anticipated and is to be monitored. In the analysis step 62, it is instead possible to monitor trends etc while taking into account the actual recorded time of production and the time intervals between the times of production of each part on the machine tool 10. In this case, the spacing between the measurement bars will be uneven. This may be appropriate, for example, if changes caused by a gradual temperature drift are to be monitored.

Figure 9:
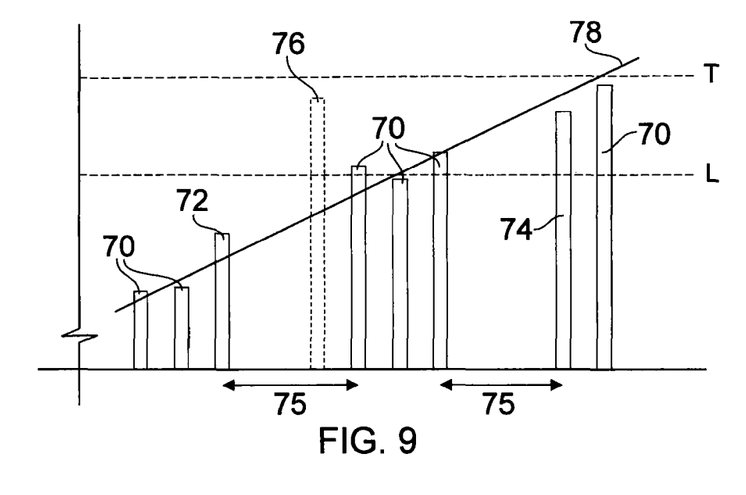

FIG. 9 illustrates a further example of uneven spacing of the measurement bars, with gaps 75 between measurements. One reason for the uneven spacing is that the analysis step 62 has detected and filtered out an outlier 76, which is not taken into account. Other reasons for the gaps 75 are that the machine tool may have suffered some downtime. And/or some inspection results may be unavailable because one of the inspection stations is busy and they have been held up. Nevertheless, the analysis proceeds continually, detecting trends and performing other analysis rules based on the measurement results which are available. Of course, the spacings may also be uneven simply because they take account of the time intervals between the actual recorded times of production of the workpieces.

It will be recognised that FIGS. 6-9 relate to a set of measurement results for just one of the dimensions or points of the nominally identical workpieces. In practice, the dimensions or coordinate points of multiple features of the workpieces may be measured, giving multiple sets of such measurement results. Each set of measurement results may be assessed in the same manner, with feedback 80 to the machine tool controller as appropriate. However, it may not be necessary to provide feedback from all the sets of measurement results. For example, if the variability of the machine tool's production process arises from tool wear, this may be assessed and corrective feedback may be provided from just one of the sets of measurement results affected by the corresponding worn tool. If the variability arises from thermal growth, it may be possible to assess this and provide corrective feedback from only one or only a few of the sets of measurement results (corresponding to only one or only a few of the measured nominally identical features).

As mentioned above, the scheduling server 28 and/or data server 29 may be located remotely from the factory. Even in this case, any of the above feedback actions may be based upon analysis in the remote server and an output signal fed back from the remote server to adjust the production machine in the factory.

Figure 3:
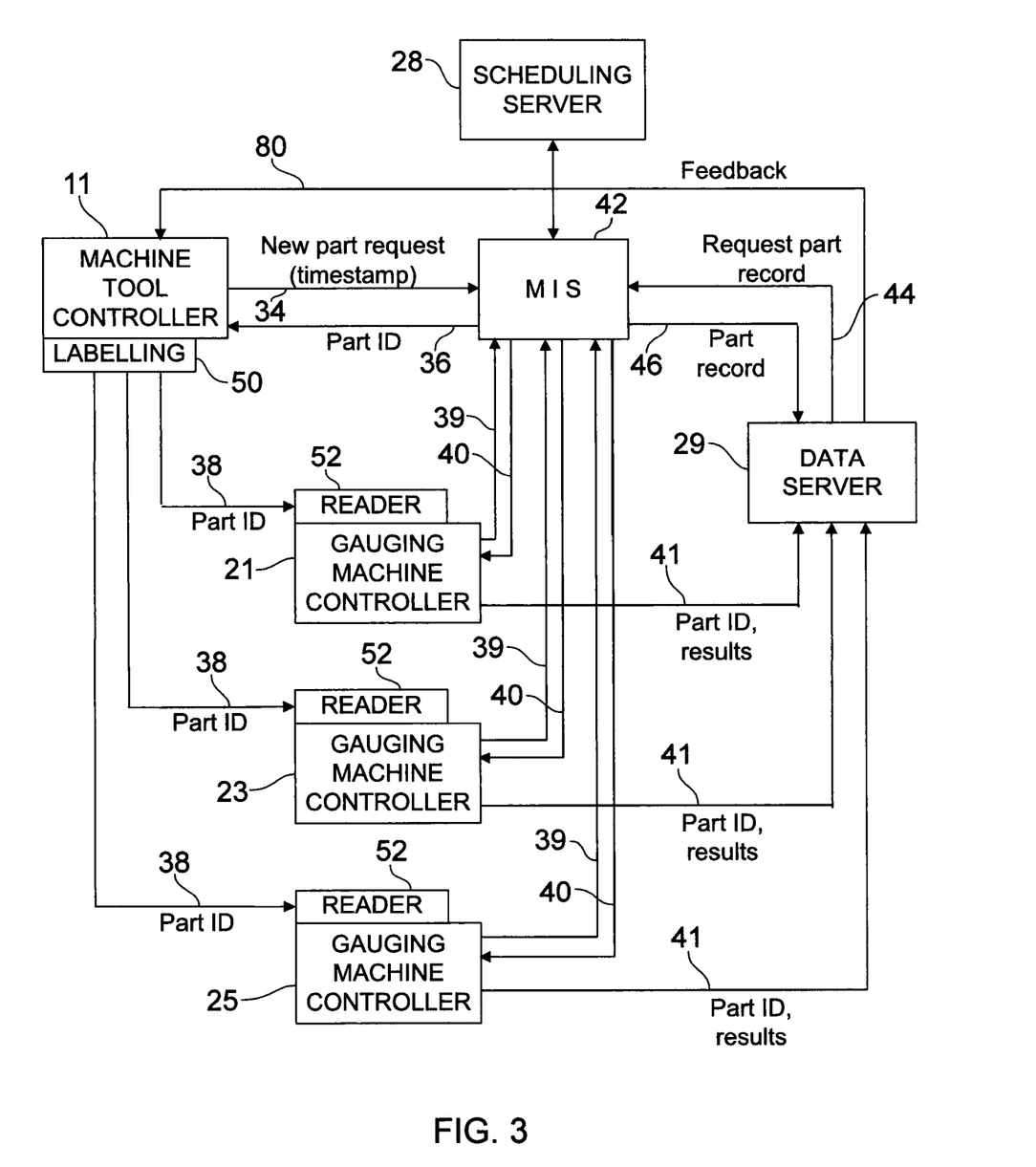
FIGS. 3 and 4 correspond to FIG. 2, showing second and third embodiments of such information flow.

FIG. 3 shows a second embodiment of a scheme for the information flow. In most respects it is similar to FIG. 2, so only the modifications will be described.

As shown in broken lines in FIG. 1, in this embodiment a manufacturing information system (MIS) 42 is associated with a production cell comprising the machine tools 10, 12, 14, 16 and the gauging machines 20, 22, 24. The MIS 42 may comprise a programmable logic controller.

This arrangement is suitable if the scheduling server 28 serves multiple such production cells in a larger factory, each production cell having its own manufacturing information server. It is also suitable if the scheduling server 28 serves several factories remotely, in which case the MIS 42 may serve several production cells.

The MIS 42 acts as the master data store for the part records seen in FIG. 5, rather than the scheduling server 28. The new part request 34 from the controller 11 of the machine tool 10 is sent to the MIS 42, with the corresponding timestamp. The MIS 42 then generates the part record (FIG. 5) including the part ID, and returns the part ID in the response 36. On receiving a part to be inspected and reading its barcode, the gauging machine controller 21, 23, 25 requests and receives the part number (and possibly the inspection part program) from the MIS 42, as indicated at 39, 40, rather than from the scheduling server. However, if desired, the scheduling server may keep a copy of some or all of the part record information. For example, the scheduling server may send the part number and/or inspection part program to the gauging machine controller when it instructs the transport system 26 to deliver the part to a particular gauging machine, so that the gauging machine controller does not need to request it.

Subsequently, when the data server 29 receives the measurement results for a part from one of the gauging machines, in step 54 of FIG. 6 it sends the part ID to the MIS 42 rather than to the scheduling server 28, to request the part record (with the timestamp). This request is shown at 44, and the return of the part record from the MIS, including the timestamp, is shown at 46. Similarly, the gauging machine controller sends the part ID to the MIS 42 to request the part number and possibly the inspection program for the part.

Figure 4:
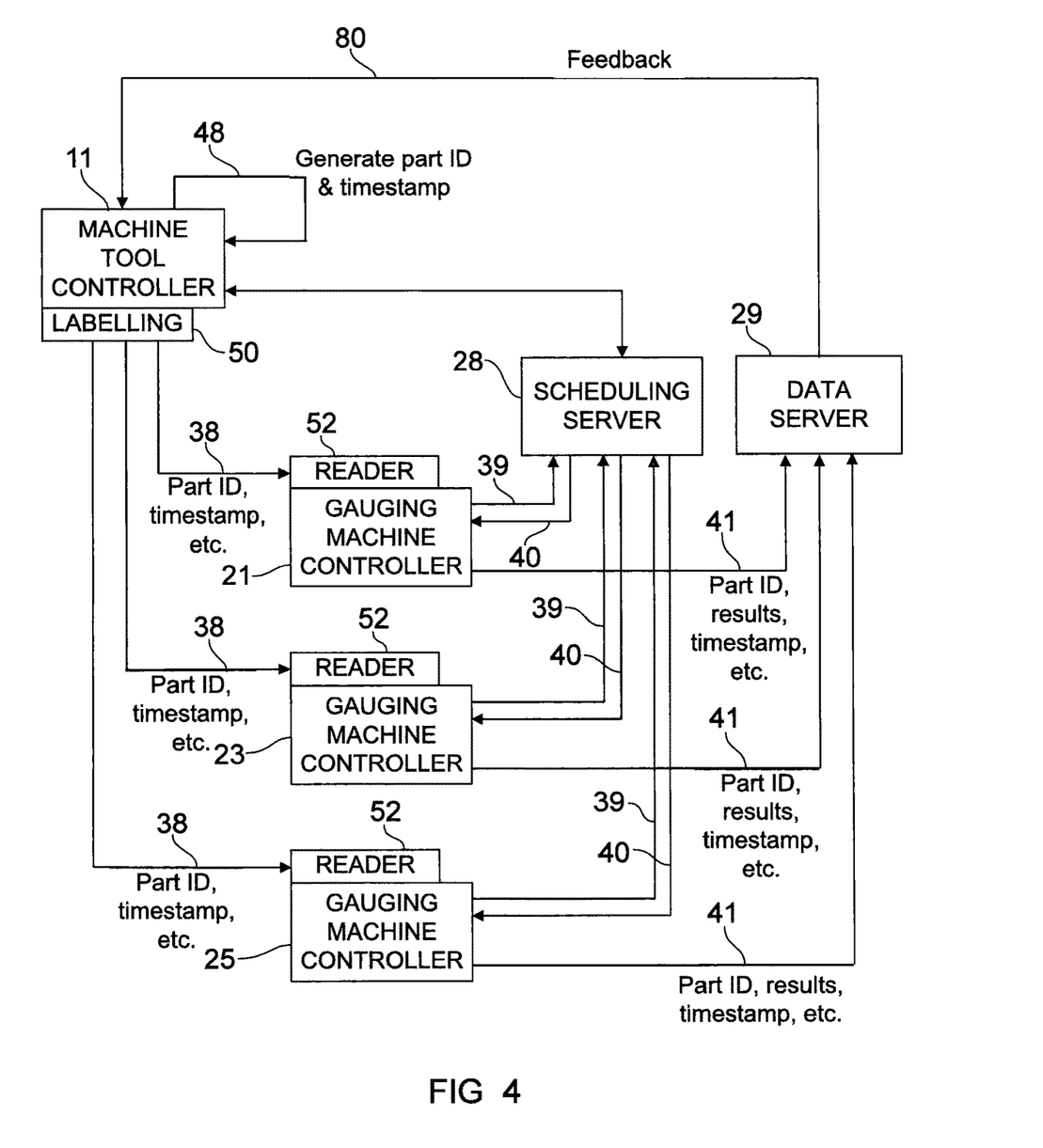

FIG. 4 shows a third embodiment of a scheme for the information flow. Again it is similar to FIGS. 2 and 3, so only the modifications will be described. In this example, when the scheduling server 28 instructs the controller 11 of the machine tool 10 over the bus 30 to produce a new part, the controller 11 generates the part ID and the timestamp internally, as indicated at 48. The labelling station 50 then encodes all of the part ID, the timestamp, the identity number MT-ID of the machine tool 10 and possibly the part number into the barcode label. This is affixed to the part or to its pallet or fixture, and transferred together with the part to whichever gauging machine 20, 22 or 24 is instructed by the scheduling server. All this information is read by the barcode reader 52 and the gauging machine controller 21, 23 or 25 passes it on to the data server 29 with the measurement results. The data server then has no need to make a separate request 54 to the scheduling server 28 for this information. If the information includes the part number and the gauging machine controller has a local copy of the corresponding inspection part program, then neither does the gauging machine controller need to request information from the scheduling server 28.

Similarly, in FIGS. 2 and 3 it is possible for the timestamp and/or the MT-ID and/or the part number to be encoded in the barcode label and travel with the part, being read by the gauging machine barcode reader and passed to the data server by the gauging machine controller.

In the above description of FIGS. 2 and 3, the measurement results have been ordered using a timestamp generated by the controller 11 of the machine tool 10. However, if desired, this timestamp may be generated by the scheduling server 28 (or by the manufacturing information system 42 in FIG. 3) and passed to the machine tool with the part ID on receipt of the new part request 34. Wherever it is generated, it is again possible for the labelling station 50 to encode it into the barcode which travels with the part, and for it to be read and passed on to the data server by the gauging machine controller.

In the above embodiments, the labelling station 50 has produced a machine-readable barcode label bearing the part ID and/or the timestamp and possibly other information, which is affixed to the part or to its pallet or fixture and travels with it from the production machine to the inspection station. However, any other suitable machine-readable technology can be used. For example, a USB or flash memory or RFID memory device may be incorporated in the pallet or fixture carrying the part, or may be attached to the part itself. The labelling stations 50 and the barcode readers 52 connected to the controllers of the machine tools and gauging machines may then be replaced by USB or RFID writing and reading devices respectively. This may be particularly suitable if more information is to be written than will fit in a barcode, e.g. including the timestamp, MT-ID and part number.

The above embodiments have used a timestamp to track the order of production of the parts. However, instead of this, the part ID may simply comprise a unique, sequentially allocated serial number, generated by the scheduling server 28, the MIS 42 or the machine tool controller itself. Being allocated sequentially, this similarly indicates the order of production of the parts on the machine tool 10. In the process control module (FIG. 6) it can be used in the same way as the timestamp to index or sort the records of the parts produced by the machine 10 into their order of production. The machine tool identity number MT-ID (and possibly the part number) may also be incorporated into the part ID with this serial number. This is particularly suitable if the part ID is generated by the machine tool controller. Once again, in this case it may not be necessary for the data server to request the part record at step 54 in FIG. 6, as it already has the information needed in the part ID.

So far, the process control has been described in respect of a series of nominally identical parts (workpieces) produced on one machine tool 10, using inspection results from two or more gauging machines 20, 22, 24. This has an advantage of flexible scheduling, since any if one of the gauging machines is busy the parts may be inspected on another gauging machine. There is also an advantage of redundancy. If one gauging machine goes out of action, then the scheduling server 28 can switch the inspection of future parts to other gauging machines.

The inspection results may also include an identity number for the gauging machine on which they were produced. It is then also possible for the process control module in the data server 29 to include a rule which compares the inspection results from different gauging machines. If it is found, for example, that the results from one of the gauging machines differ significantly from the results of other gauging machines, when measuring nominally identical parts produced by the same machine tool, then the process control module may diagnose that a problem lies with that gauging machine rather than with the machine tool. For this purpose, the analysis of the results comprises comparing the results of the measurements of corresponding dimensions or points made on the separate inspection machines, and the output signal is provided if the results from one of the inspection machines differ by more than a predetermined amount from the results of one or more of the other inspection machines. Again, the data server may then instruct the scheduling server to switch the inspection of future parts to other gauging machines. It may also trigger an alarm or send a message to a human operator to investigate the problem, e.g. whether the gauging machine concerned has drifted out of specification. Or it may adjust the results obtained from the gauging machine whose results differ, the results being adjusted by an amount which depends on the output signal.

Of course, the other machine tools 12, 14, 16 will also be producing parts, perhaps to the same design as the parts produced on the machine tool 10, or perhaps to a different design (different part number). Records are kept and information including timestamps, part IDs and machine tool identity numbers are generated and transferred in the same way as above. The scheduling program in the server 28 is programmed to schedule their inspection in the same way, on whichever of the gauging machines 20, 22, 24 is most convenient or efficient. So there is a further advantage of flexibility, since any part may be inspected on any gauging machine. And the process control module of the data server 29 then performs process control for each of those machine tools 12, 14, 16 in the same way, noting which machine tool produced each part and their order of production on that machine tool.

There is a further redundancy advantage in this latter case, if one of the machine tools goes out of action (perhaps with a problem detected by a rule in the process control module). There is no gauging machine dedicated to that machine tool which would also become unproductive. The scheduling server can switch the production of parts to other machine tools, and it can continue to allocate the inspection work amongst all the gauging machines.

The invention claimed is:

1. A workpiece production method comprising:
   producing a plurality of nominally similar workpieces in a production process on a production machine;
   recording the order or time of production of at least some of the workpieces on the production machine;
   measuring at least some of the workpieces so recorded at two or more inspection stations, wherein dimensions or points of a feature of one of the workpieces are measured at one of the inspection stations, and wherein corresponding dimensions or points of a corresponding feature of another of the workpieces are measured at another of the inspection stations;
   choosing which of the two or more inspection stations is used to measure each of the at least some workpieces measured in the measuring step based on whichever of the two or more inspection stations is least busy or most appropriate;
   analysing together results of the measurements of corresponding dimensions or points made at the two or more inspection stations, taking account of the order or time of production of the workpieces; and
   producing an output signal based on the analysing of the results together, the output signal indicating performance of the production machine or of one or more of the inspection stations.

2. The method according to claim 1, wherein the order of production of the workpieces is derived from the times of their production.

3. The method according to claim 2, wherein the analysing of the results takes account of time intervals between the times of production of the workpieces.

4. The method according to claim 1, wherein the analysing of the results of the measurements produces an ordered history of the performance of the production machine or of a tool or tool turret of the production machine over time.

5. The method according to claim 1, wherein the analysing of the results of the measurements includes detecting whether there is a trend in the results of the measurements over time.

6. The method according to claim 1, wherein the analysing of the results of the measurements includes detecting whether there is a trend in the performance of the production machine or of a tool or tool turret of the production machine over time.

7. The method according to claim 1, wherein the analysing of the results of the measurements includes detecting when a particular dimension of a workpiece or the coordinates of a particular point has exceeded a control limit.

8. The method according to claim 1, wherein the analysing of the results of the measurements includes filtering a series of measurements of a particular dimension or point on successive workpieces to smooth the results or to remove outliers.

9. The method according to claim 8, including detecting when the filtered series of measurements has exceeded a control limit.

10. The method according to claim 1, wherein the results of the measurements are analysed statistically to determine the process capability of the production machine or of a tool or tool turret of the production machine which produced the workpieces.

11. The method according to claim 1, wherein each workpiece is assigned an identity number in machine readable form, which travels on or with the workpiece from the production machine to a relevant one of the inspection stations, and the order or time of production of the workpiece is recorded centrally with the workpiece identity number.

12. The method according to claim 1, wherein the time of production of each workpiece, or a number indicating the order of production of the workpiece, is recorded in machine readable form and travels on or with the workpiece from the production machine to a relevant one of the inspection stations.

13. The method according to claim 1, wherein the production machine and the inspection stations are located in a factory, and the analysis of the results of the measurements and the production of the output signal take place at a location remote from the factory.

14. The method according to claim 1, including feeding the output signal back to the production machine to adjust the production process of the production machine.

15. The method according to claim 14, wherein the output signal which is fed back to the production machine comprises a tool offset value to correct production of future workpieces.

16. The method according to claim 1, wherein the output signal provides a measure of process capability of the production machine or of a tool or tool turret of the production machine.

17. The method according to claim 1, wherein the output signal includes an alarm signal or a message to a human operator produced if the results are approaching or exceed a predetermined limit value or tolerance value.

18. The method according to claim 1, wherein the analysing of the results comprises comparing the results of the measurements of corresponding dimensions or points of the features made at the two or more inspection stations,
and wherein the output signal is provided if the results from one of the inspection stations differ by more than a predetermined amount from the results of one or more of the other inspection stations.

19. The method according to claim 18, including adjusting results obtained from the said one of the inspection stations whose results differ, the results being adjusted by an amount which depends on the output signal.

20. The method according to claim 1, wherein there are a plurality of production machines, each production machine being associated with two or more inspection stations, and wherein each inspection station measures dimensions or points on workpieces produced only by one particular production machine.

21. The method according to claim 1, wherein there are a plurality of production machines, each production machine being associated with two or more inspection stations, and wherein one or more of the inspection stations measures dimensions or points on workpieces produced by more than one of the production machines.

22. A manufacturing system comprising:
one or more production machines;
two or more inspection stations; and
a control system for scheduling the production of workpieces on the one or more production machines and the inspection of workpieces so produced at the inspection stations,
wherein the control system is configured to operate the method according to claim 1.

23. The method as claimed in claim 1, wherein the production machine is a machine tool.

24. The method as claimed in claim 1, wherein the analysing of the results of the measurements includes detecting whether a particular dimension of the corresponding features is gradually increasing or decreasing in size as successive ones of the workpieces are produced.

25. The method as claimed in claim 1, wherein dimensions or points of multiple features of the workpieces are measured in the measuring step.

26. The method as claimed in claim 1, wherein the points are coordinate points.

* * * * *